Feb. 28, 1967  A. A. NORDGREN  3,306,144
APPARATUS FOR CUTTING CROSS-STRANDED MESH MATERIAL
Filed Dec. 23, 1964  6 Sheets-Sheet 1

INVENTOR
Alfred A. Nordgren
BY Delio and Montgomery
ATTORNEYS

Feb. 28, 1967      A. A. NORDGREN      3,306,144
APPARATUS FOR CUTTING CROSS-STRANDED MESH MATERIAL
Filed Dec. 23, 1964      6 Sheets-Sheet 4

INVENTOR
Alfred A. Nordgren

BY Delio and Montgomery
ATTORNEYS

INVENTOR
Alfred A. Nordgren

United States Patent Office 3,306,144
Patented Feb. 28, 1967

3,306,144
APPARATUS FOR CUTTING CROSS-STRANDED MESH MATERIAL
Alfred Alling Nordgren, New Britain, Conn., assignor to The Leonard Concrete Pipe Company, Inc., Hamden, Conn., a corporation of Connecticut
Filed Dec. 23, 1964, Ser. No. 420,653
17 Claims. (Cl. 83—80)

This invention relates to a machine for measuring and cutting strip material and more particularly to a machine and method for cutting discreet lengths of wire mesh, sheet, paper and the like, which are continuously fed to the machine.

In many of the prior art machines, materials in the form of mesh, sheet, paper and the like, are fed from a roll into the machine, but during the measuring and/or cutting operation the feeding instrumentality is de-activated and the feed interrupted. Consequently many of the prior art processes are slow and non-continuous, thereby resulting in relatively high operating costs. Other prior art machines which allow for continuous feeding of the material have generally been over-sophisticated in design, thus entailing an excessive investment in capital for the machinery, which is not economically attractive. In addition, some of the designs employ complicated and cumbersome mechanical and electrical elements which are subject to considerable down time and require the constant attention of highly skilled operators.

Other prior art devices, while permitting continuous feeding of wire mesh or the like, have utilized stationary cutting or severing devices. The use of such stationary cutting devices causes both curling and bending of the wire while it is being cut. Thus the devices of the prior art increased the waste and scrap due to the deformation of the wire and, in addition, did not provide a means for accurately severing wire mesh strands. Accordingly, in the measuring and cutting of wire mesh, for example, many users and fabricators have continued to employ relatively crude and time-consuming manual methods for cutting the material. These methods are not automated, require considerable manual labor and, as a result, the output of measured wire mesh is necessarily limited.

Accordingly, a new machine was necessary to effect the cutting of wire mesh or other material which is continuously fed into the machine, without bending or destroying the material and, further, a machine was required to remove the cut mesh product or the like after it was severed by the machine.

Therefore, the instant invention results in a new and useful machine for measuring and cutting strip material, and wire mesh in particular, which employs a unique combination of elements and steps and which avoids the disadvantages of the prior art devices and methods, and wherein measured lengths of wire mesh, sheet, paper and the like, can be continuously cut and processed without the need for de-activating the feeding instrumentality.

In view of the foregoing, an object of this invention is to provide a new and improved machine for severing continuously fed material.

Another object of this invention is to provide a new and improved cutting and stacking machine for cutting material continuously being fed from a stock of such material and thereafter stacking the material after it has been severed by the machine.

Another object of this invention is to provide a cutting machine which first determines the length of wire or material to be severed and then actuates a cutting device for severing the material.

Another object of this invention is to provide a new and improved means for moving a portion of the cutting machine in order to permit the material to be cut to be continuously fed into the machine while the cutting operation is taking place.

Another object of this invention is to provide new and improved means for correctly positioning the wire mesh with respect to the cutter prior to effecting severance of the material.

An additional object of this invention is to provide new and improved means for cutting the strands of wire mesh to a closer tolerance than that heretofore employed.

Still other objects and advantages of the invention will in part be obvious and will in part be apparent from the specification.

In accordance with this invention a machine tool is provided which includes means for moving the cutter apparatus in the same direction as the flow of material entering the cutter, means for measuring the material to be cut, and means for severing the material to be cut.

In the preferred embodiment of the invention, the machine tool comprises a counting wheel to determine the amount of material to be cut, means responsive to the counting means to effect movement of the cutter in the same direction as the flow of material entering the machine and means responsive to the movement of the machine to remove the material from the machine after the material has been severed. The preferred embodiment further includes means for aligning the material to be cut and means for stacking the cut material.

The invention accordingly comprises the several steps and the relation of one or more steps with respect to each other and the apparatus embodying features of construction, combinations of elements and arrangements of parts which are adapted to effect such steps, all as exemplified in the following detailed disclosure and the scope of the invention will be indicated in the claims.

For a fuller understanding of the invention, reference is had to the following description taken in conjunction with the accompanying drawings, in which.

Figure 1:
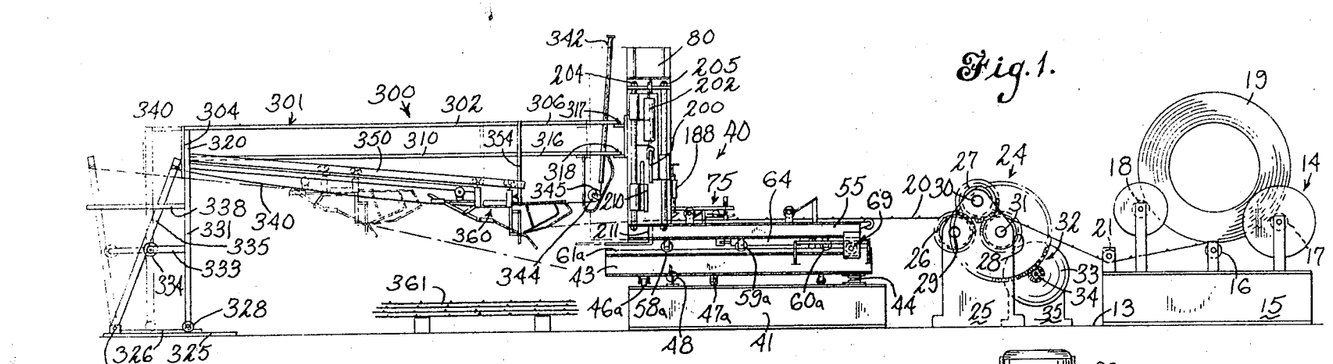
FIG. 1 is a side elevational view of a machine according to this invention.
Figure 2:
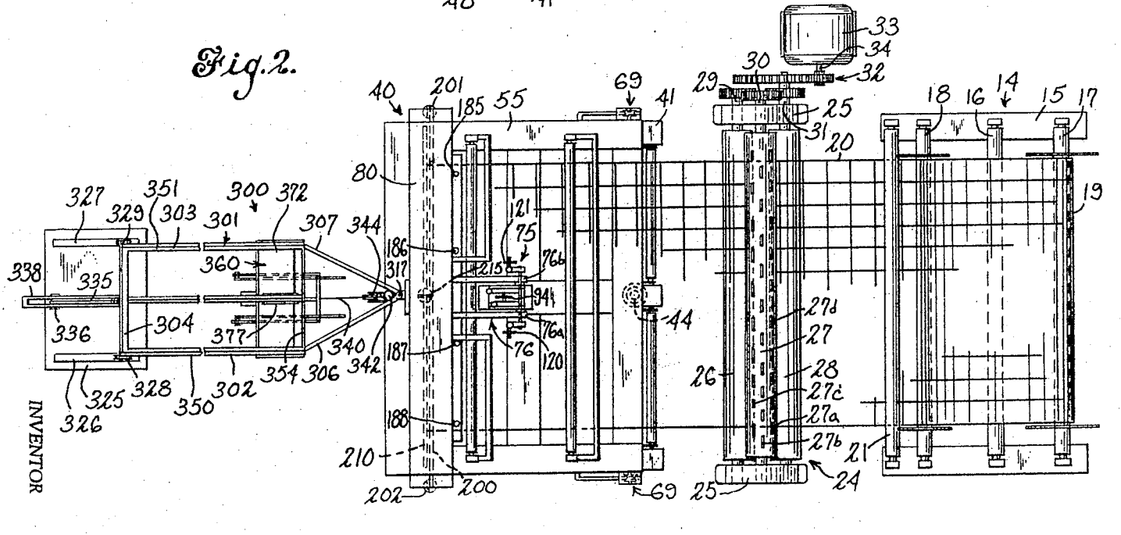
FIG. 2 is a top view of a machine according to this invention.

Referring now to FIGS. 1 and 2, positioned along main frame 13 is a wire mesh supporting mechanism shown generally at 14. The mechanism 14 comprises a base member 15 provided with reel supports 16, 17 and 18. Positioned on said supports is a reel of wire mesh, sheet, paper or the like, 19 which, upon unrolling, provides a continuous supply and flow of wire mesh 20 which is guided from reel 19 by guide roll 21 to a wire feeding mechanism generally shown at 24. The mechanism 24 comprises a base support member 25 for supporting a plurality of wire mesh driving rolls 26, 27 and 28. Wire mesh 20 is fed underneath driving roll 27 and on top of driving rolls 26 and 28. The wire is pushed through these rolls by substantially rectangular protrusions, some of which are shown at 27a, 27b, 27c, 27d, etc., positioned along roll 27 as more clearly shown in FIG. 2. These protrusions push the wire through the driving roll arrangement by engaging the strands of mesh and exerting a forward force on the strands. Rolls 26, 27 and 28 are provided with shafts 29, 30 and 31 which are preferably driven by a gear train or box generally shown at 32. The gear train 32 is driven by motor 33 having a shaft 34 which provides the rotational force necessary for rotation of said gear train. The motor 33 is preferably positioned on motor support 35 in proximity to the driving roll support 25.

If light weight wire mesh is being processed through the machine, it may be desirable to employ an additional feeding instrumentality between the feeding mechanism 24 and the main portion of the machine. This additional feeding instrumentality would preferably comprise a driving roll similar to roll 27 and a cooperating idler roll in two high fashion. This additional feeding instrumentality is employed so as to substantially decrease the tendency of the light weight mesh to curl and buckle.

When unperforated material such as metal, sheet, strip, paper or the like, is to be processed through the main portion of the machine, the feeding mechanism or instrumentality may be in the form of a two high, four high, cluster or Z mill, or calender rolls, by way of example.

Wire 20 is fed from the feeding mechanism 24 to the wire mesh cutting portion of the machine, generally shown at 40, which comprises a base 41 upon which there is mounted carriage 43. The carriage 43 is pivoted to base 41 by pivot connection 44 and is free to rotate about pivot point 44. In order to permit the carriage to pivot, the underside of the carriage closest to base 41 is provided with a plurality of rollers wheels 46a, 46b and 46c, as more clearly shown in FIGS. 3 and 4. A second set of roller wheels is also coupled to the underside of carriage 43, one of which is shown at 47a, FIG. 1. To move the carriage about the pivot point 44, there is provided a hydraulic or, preferably, a pneumatic cylinder mechanism 48. The cylinder 48 is mounted to the base at 49 and to the underside of the carriage 43 at 50.

Positioned on the upper side of carriage 43 is a table 55 over which wire mesh 20 is fed after it leaves the driving mechanism 24. Coupled to the underside of table 55 is a plurality of roller wheels 58a, 58b, 58c, 59a and 60a, which are guided by carriage mounted guide rails 61a, 61b and 61c as more clearly shown in FIG. 3. The roller wheels and the guide rails permit table 55 to move along the guide rails (with respect to the carriage) in a direction substantially parallel to the direction of flow of wire mesh 20. The table is moved with respect to the carriage by a hydraulic, or preferably pneumatic cylinder 64 positioned between the underside of the table and the top side of the carriage. The table and carriage are coupled together by hook rolls and hook roll frames, generally shown at 69. These hook rolls act to stabilize the table on the carriage so as to prevent tipping.

Figure 5:
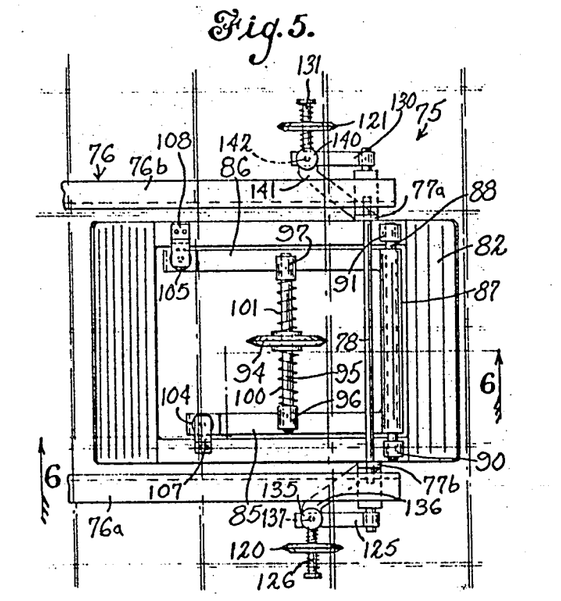
FIG. 5 is an enlarged view of the measuring and alignment portions of the machine according to this invention.
Figure 6:
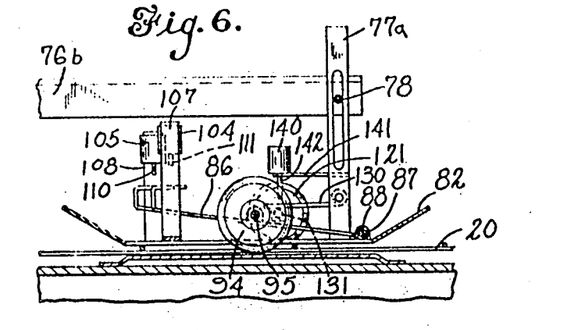
FIG. 6 is a view taken along line 6—6 of FIG. 5.

Referring now to FIGS. 5 and 6 in particular, there is shown at 75 an arrangement for the counting wheel mechanism and a portion of the mechanism for detecting misalignment of the wire being fed over the table. The counting wheel mechanism and the mechanism for detecting misalignment of the mesh being fed to the table, is supported above the wire mesh by supporting member 76 having members 76a and 76b, and 77a and 77b and rod 78. The supporting member 76 is itself supported by frame 80 mounted at one end of table 55 and is positioned substantially perpendicular to the table surface. The supporting member 76 extends substantially at right angles from frame 80 so as to permit the counting mechanism to overlie the wire mesh as it is being fed over the table. Coupled to supporting members 77a and 77b is a frame 82 which extends parallel to the top of the table. Connected to frame 82 are contact arms 85 and 86 mounted on tubular member 87 which is coupled to frame 82 by way of rod 88 extending through the tubular member 87. The rod 88 is supported by supports 90 and 91 mounted on the frame 82. The assembly of arms 85 and 86 and tubular member 87 is such that it is free to rotate about rod 88. Mounted between arms 85 and 86 is a wheel 94 which is positioned in such a manner as to make contact with the cross strands of the wire mesh as it is being fed over the table top. The wheel 94 is supported by a rod 95 rotatably mounted at 96 and 97 to arms 85 and 86. The wheel 94 is held in place between arms 85 and 86 by springs 100 and 101 which are positioned on either side of the wheel along rod 95. The springs 100 and 101 act with the preferably beveled edge of wheel 94 to keep wheel 94 positioned so that contact is always made with a horizontal cross strand instead of with a vertical cross strand of the wire mesh. If the wire mesh 20 is fed over the table such that a vertical cross strand initially contacts the wheel, the wheel 94, due in part to its beveled edge, will slide off the vertical cross strand and therefore be in the proper position for sensing the horizontal cross strand.

Also mounted on frame 82 are two microswitches 104 and 105, which are raised above the normal position of contact arms 85 and 86 by supporting members 107 and 108 extending substantially perpendicularly to frame 82. The microswitches 104 and 105 include plungers 110 and 111, respectively. These switches are closed in response to contact arms 85 and 86 effecting movement of plungers 110 and 111, respectively. The arm 85 and microswitch 104 are positioned such that the microswitch will be actuated upon the initial contact of wheel 94 with a cross strand of mesh 20. Arm 86 and switch 105 are positioned so that the switch 105 will only be actuated when the wheel is on top of the cross strand. Thus switches 104 and 105 will be actuated in a time delayed sequence.

Also supported by member 77 are two feeler wheels 120 and 121 for detecting when the wire mesh on the table is misaligned with respect to the cutting portion of the machine. The wheel 120 is pivotally supported from the member 77a by an arm 125. The wheel 120 is resiliently mounted on a shaft 126 extending from arm 125. The wheel 121 is also supported from member 77b and is pivotally attached to member 77b by way of an arm 130. A shaft 131 coupled to arm 130 supports resiliently biased wheel 121. Also attached to supporting member 77a is microswitch 135 coupled to and supported by an arm 136. Microswitch 135 has a plunger 137 extending therefrom in such a manner that upon movement of arm 125 due to movement of wheel 120, the switch 135 will be actuated. Mounted above arm 130 is a second microswitch 140 rigidly supported from member 77b by an arm 141.

Switch 140 has a plunger 142 which, when contacted by arm 130, is actuated. Both switches 135 and 140 are actuated when wheels 120 and 121 respectively come in contact with and are raised by the passage of a cross strand of wire.

Figure 7:
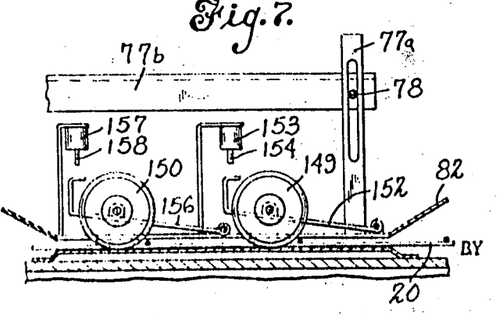
FIG. 7 is an alternate embodiment of a measuring portion of the machine according to this invention.

In FIG. 7 there is shown an alternate embodiment for the single counting wheel 94 of FIGS. 5 and 6. As shown, the single counting wheel 94 is replaced by separate counting wheels 149 and 150. Wheel 149 is coupled to a contact arm 152 which is utilized to actuate a microswitch 153 having a plunger 154. Counting wheel 150 is coupled to a moveable contact arm 156 which is utilized to actuate microswitch 157 having a plunger 158. In this instance wheel 149 is positioned such that it actuates switch 153 upon rising to the topmost position of the cross strand, whereas switch 157 is actuated when wheel 150 begins to climb up the cross strand. Thus a timed relationship exists between the actuation of microswitches 153 and 157.

Figure 3:
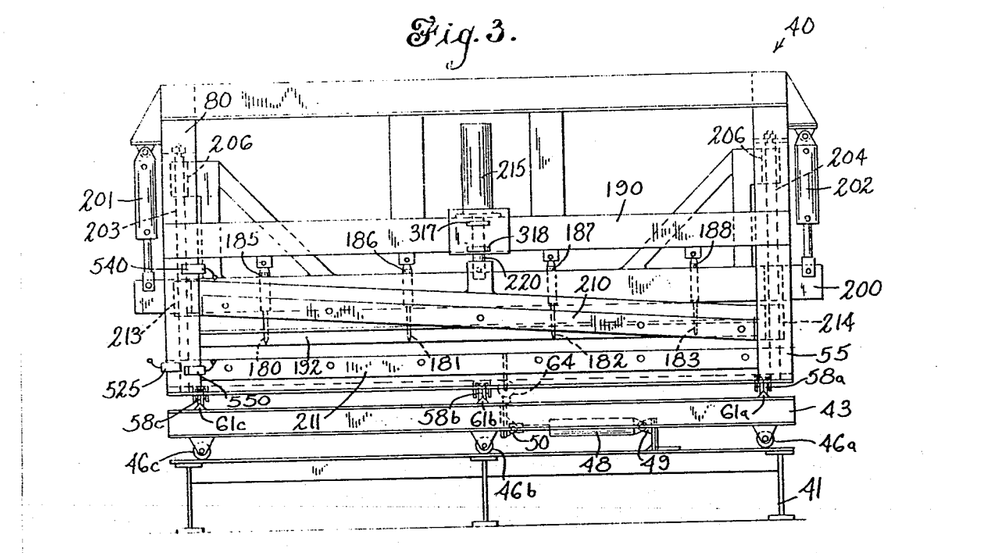
FIG. 3 is a front elevational view of the cutting portion of the machine according to this invention.
Figure 8:
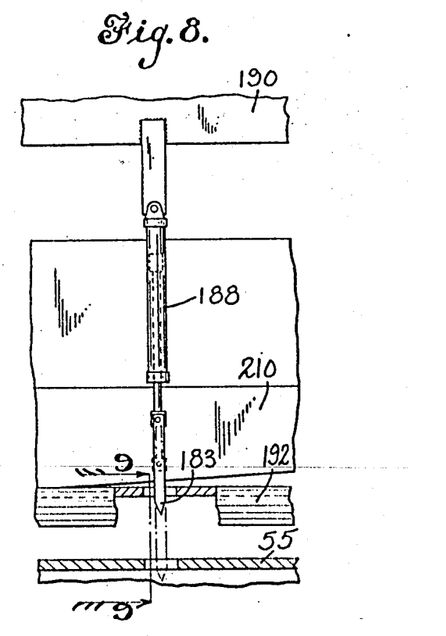
FIG. 8 is an enlarged sectional view of one of the arresting means, taken along line 9—9 of FIG. 4.
Figure 9:
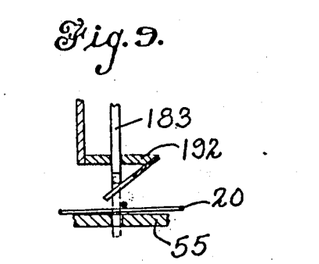
FIG. 9 is a sectional view taken along line 9—9 of FIG. 8.
Figure 10:
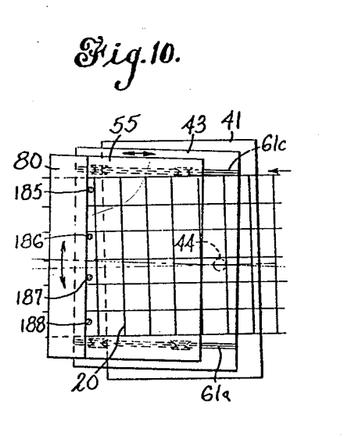
FIG. 10 is a top view illustrating the relationship between the base, carriage and table portions of the cutting portion of the machine according to this invention.

Referring now in particular to FIGS. 3, 8 and 9, there is shown a plurality of wire mesh stops 180, 181 and 182 and 183, coupled by way of pneumatic or hydraulic cylinders 185, 186, 187 and 188 respectively to a supporting bar 190 which is attached at its ends to frame 80. Stops 180 through 183 are guided by openings in a second bar 192 which extends from frame 80. The stops are actuated after counting wheel 94 and its respective switch has counted a predetermined number of cross strands, after which time stops 180 through 183 come down between the cross strands of the wire mesh material. The action of the stops 180 through 183 is such that the wire mesh material will be positioned in a manner such that all the cross strands are substantially parallel to the stops. This is accomplished by pivotal movement of the carriage 43 and table 55 with respect to the base 41, as more clearly shown in FIG. 10. The amount of movement of the mesh upon contact with the stops is generally enough to correct for any slight misalignment of the wire mesh.

Figure 4:
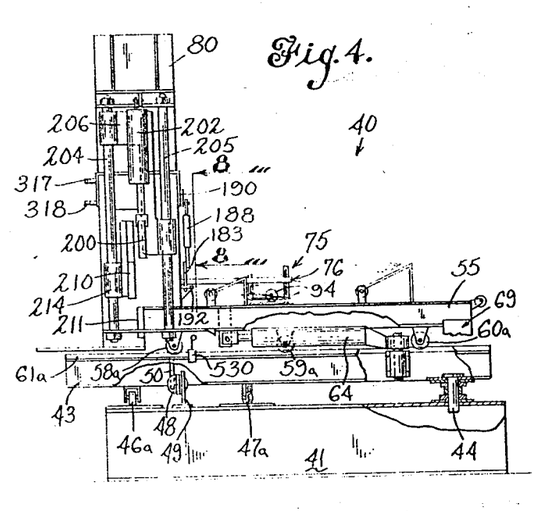
FIG. 4 is a side elevational view of the cutting portion of the machine according to this invention.

Referring now to FIGS. 3 and 4, a wire clamp 200 is shown coupled to the frame 80 by a pair of actuating pneumatic cylinders 201 and 202. The clamp 200 is utilized to clamp the wire to the table prior to the cutting operation. Clamp 200 is guided by the combination of front rods 203 and 204, a rear rod 205 and a rear rod identical to but positioned opposite rod 205, a guide member 206 and a guide member identical to but positioned opposite member 206.

Referring again to FIGS. 3 and 4, to effect the cutting or severing of wire 20, there is provided a movable top cutting blade 210 and a lower cutting blade 211. Cutting blade 210 is guided within the frame 80 by the front rods 203 and 204 and guide members 213 and 214. Blade 210 is actuated by a hydraulic cylinder 215 mounted on the support bar 190. After the stops and clamp have engaged the wire, the cutting blade is actuated by suitable means described below. The top blade 210 is preferably initially positioned at an angle so that the blades will sequentially sever the strand of the wire mesh instead of the blade making contact and severing all the strands at the same time.

Figure 11:
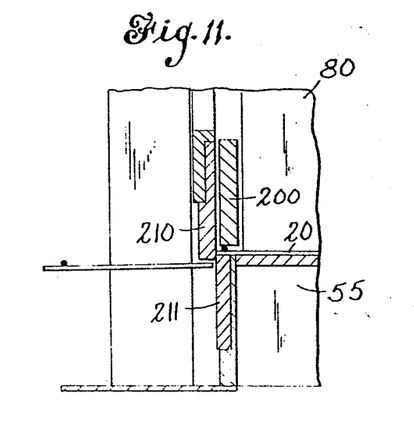
FIG. 11 is a partial enlarged view of the clamping and cutting blade mechanism in a closed position.
Figure 12:
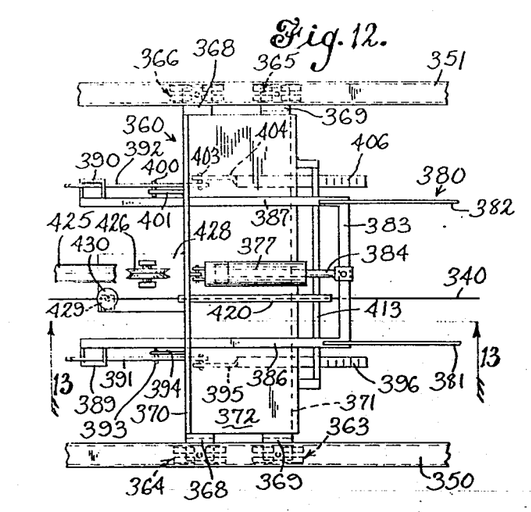
FIG. 12 is an enlarged top view of a portion of the stacking portion of the machine according to this invention.
Figure 13:
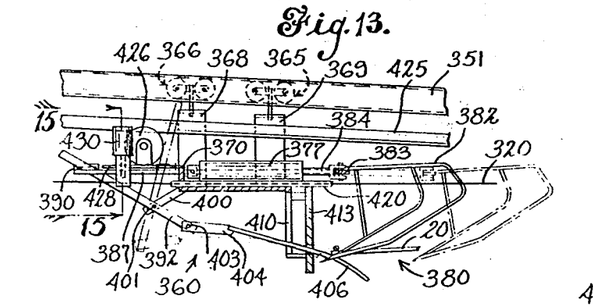
FIG. 13 is a sectional view taken along line 13—13 of FIG. 12.
Figure 14:
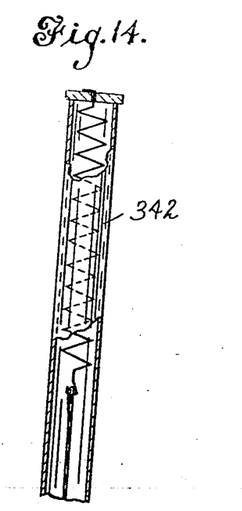
FIG. 14 is a partial enlarged view of the spring housing of the stacking portion of the machine according to this invention.
Figure 15:
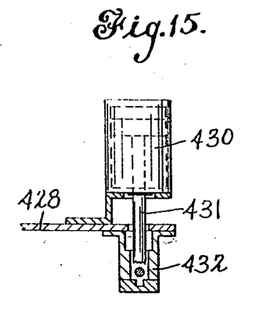
FIG. 15 is a view taken along line 15—15 of FIG. 13.

In FIG. 11 there is shown an enlarged view of the position of upper blade 210 with respect to lower blade 211 when the former is depressed to effect cutting of the wire mesh material. Clamp 200 is also shown positioned to effect clamping of the wire mesh prior to moving upper cutting blade 210 in a direction to effect severance of the wire mesh. The blades are preferably spaced from the stops a distance to accurately cut the cross strands within a quarter of an inch of the cross bar to effect a so-called "zero" cut.

Turning now to FIGS. 1, 2 and 12 through 15, there is shown the stacking or palletizing portion of the machine according to this invention. The stacker, generally shown at 300, comprises a top main frame 301 comprising side members 302 and 303, a cross member 304 coupled between the two side members and two end members 306 and 307 coupled to the other ends of the side members 302 and 303. Underlying the top portion of the frame is a second (identical) frame having a side member 310 and an end member 316. The two identical five-sided top frames are coupled to frame 80 of the cutter at 317 and 318, respectively, and the side members of these frames are joined together at their ends by bars, one of which is shown at 320 in FIG. 1.

The stacker also comprises a base member 325 spaced at a distance from the cutting apparatus and this base member is provided with two tracks, 326 and 327. These tracks are coupled to guide roller wheels 328 and 329 which are mounted on support bars 331 extending from the top portion of the frame 301. Coupled between the vertical support bar 331 and another parallel spaced vertical support bar is a cross bar member underlying member 304. Connected to this cross bar member is a member 333 which is pivotally mounted at 334 to a movable member 335. The member 335 is pivoted at 336 to the base 325 and is guided by a slotted member 338 which is also coupled to a horizontal bar positioned between the bar 331 and the vertical bar parallel to support 331. The combination of the above-mentioned members permits the member 335 to pivotally move within the slotted portion 338 as the stacker moves in a direction toward the left of the paper. This is a result of the lower wheels and tracks 328, 329, 326 and 327, respectively, permitting frame 301 to move in a direction toward the left side of the paper of FIG. 1 along with the movement of the cutting portion of the machine during the cutting operation.

The member 335 is coupled to a guide wire 340 which extends from member 335 along the length of the stacking apparatus and is coupled to a spring assembly 342 which is mounted by a support 343 to frame 301 of stacker 300. The guide wire 340 is held in a taut manner by pulley 344 which is mounted on a supporting member 345 extending from the top portion of the frame. The spring assembly and the guide wire permit member 335 to pivotally move when the stacker moves toward the left of FIG. 1 and then draws member 335 back into position when the stacker moves back to the right of the figure.

Extending from cross bar 320, preferably at an angle to sides 302 and 310 and to the other sides of the top frame (not shown), are guide tracks 350 and 351. The guide track 350 is shown supported by vertical member 354 extending from side bars 302 and 310. The guide track 351 is supported in a similar manner although its support is not shown in the drawings.

Guided by guide tracks 350 and 351 is a sled, generally shown at 360, for receiving wire mesh 20 as it passes through the cutter portion of the machine. The sled also acts to draw the wire away from the cutting portion of the machine during and after the time the wire mesh is cut and provides a means for stacking the wire mesh in a pile, generally shown at 361. The sled 360 is guided in roller guides 350 and 351 by roller wheel members 363, 364, 365 and 366. The sled is supported at a distance below roller guides 350 and 351 by members 368 and 369 which are coupled to wheels 365 and 366 riding within guide 351. The sled portion 360 is supported from roller wheels 363 and 364 by similar members.

The sled 360 includes horizontal members 370 and 371 for supporting a flat plate 372. Pivotally attached to plate 372 is a pneumatic cylinder 377 for moving a hooking portion 380 in a direction to the right side of FIG. 13, as shown by the dotted lines of FIG. 12. The hooking portion is a part of the sled which acts to receive the wire as it is fed out of the cutting portion of the machine. The hooking portion also includes top members 381 and 382 coupled by a cross bar 383 to a plunger 384 of the cylinder 377. The cross bar 383 is provided with two longitudinal bars 386 and 387 having two side members 389 and 390 extending from their ends. To guide the guide elements 389 and 390 are two guided rods 391 and 392. Guide rod 391 is pivotally coupled at 393 to the member 370 by way of a support member 394. The rod 393 is also pivotally coupled at one end to a member 395. Member 395 is in turn coupled to a bottom hooking member 396, while member 396 is positioned such that it cooperates with hooks 380 to catch the wire mesh 20 as it comes from the cutter. The guide rod 392 is pivotally coupled at 400 to a support rod 401 which is coupled to the member 370. The guide 392 is pivotally connected at 403 to a member 404 which is in turn connected to a member 406 which is a hooking member similar to hooking member 396. The member 406 is also positioned in the same manner as the member 396. The combination of the rods and the pivotal members move the member 396 in the upwardly direction shown by the dotted lines in FIG. 13, when the top members 381 and 382 are moved to the right to release the wire. Also supported from the bottom of plate 372 is a support member 410 which is utilized to support a back-up plate 413. The back-up plate 413 is positioned such that it prevents the wire mesh, after it has been hooked by the combinational operation of hooks 380 and 396 and 406, from penetrating into the sled as the wire mesh is received from the cutting machine.

While the cross strands are being counted, the sled will move in a direction toward the left side of the paper and will be guided by rollers 363 through 365 riding in guide members 350 and 351. To release the wire mesh so as to stack it in the pile 361, the pneumatic mechanism is actuated which causes the top members of hook 380 to move toward the right of FIG. 13 as shown by the dotted lines. At the same time bottom hooks 390 of hooking members 396 and 406 move in an upwardly direction due to the movement of the guide members 391 and 392. Thus the wire mesh is then released and dropped on the pile 361. Also coupled to plate 372 is a tubular member 420 through which there is passed the guide wire 340. Extending between guide members 350 and 351 is another guide member 425 which is coupled at one end to the upper, topmost frame 301 and extends downwardly at substantially the same angle as guide members 350 and 351. A member 425 is supported at this angle by guide cross members extending from the top portion of the frame 301. The guide member 425 is utilized to guide the guide wheel 426 which is mounted on a guide plate 428. The guide plate is also coupled to plate 372 so that it moves in unison with the sled. Mounted on plate 428 by a flange 429 is a pneumatic cylinder 430 having a plunger 431. Extending from plate 428 is an enclosure 434 which permits guide wire 340 to pass therethrough, between the bottom of enclosure 435 and plunger 431. The pneumatic cylinder 430 and plunger 431 are utilized to clamp the wire 340 to cause the sled to move in the same direction as the table during the cutting operation.

Figure 16:
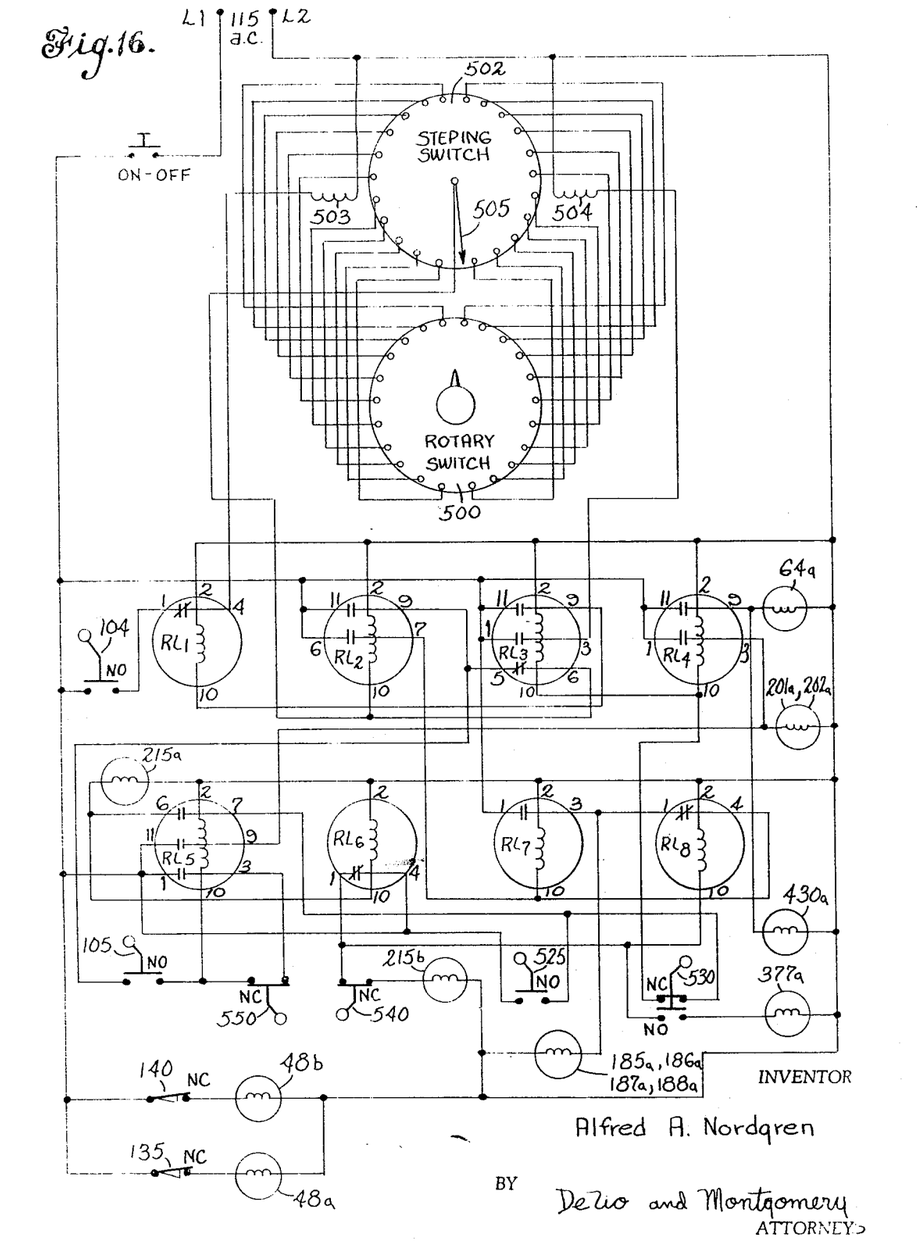
FIG. 16 is a schematic wiring diagram of a control system suitable for use in the machine shown in FIGS. 1–15.

Referring now to FIG. 16, there is shown an electrical control system for automatically controlling the operation of the cutting and stacking apparatus according to this invention. The control circuit comprises a rotary switch 500 for setting the number of cross strands to be counted before the cutting operation is started. Coupled to the rotary switch 500 is a stepping switch 502 having a stepping coil 503 and a reset coil 504. The stepping switch 502 is actuated in response to switch 104 which is in turn actuated by the wheel 94 counting the cross strands. Connected as shown to the stepping switch 502 and rotary switch 500 are eight relays, $RL_1$ through $RL_8$ which are of the multiple contact type. A pair of parallel lines within the relay represents a normally open contact and each pair of parallel lines with a slash line through it represents a normally closed contact. Also coupled in the circuit are the solenoids and the solenoid valves for actuating the various hydraulic or pneumatic cylinders, previously mentioned. The solenoids of the solenoid valves are numbered so as to correspond to the respective cylinder which it actuates. For example, solenoids 48a and 48b are the solenoids coupled to a four-way solenoid valve which controls cylinder 48, and solenoid 64a is coupled to a three-way solenoid valve which controls cylinder 64. Additionally, solenoids 185a, 186a, 187a and 188a are part of three-way solenoid valves which control cylinders 185 through 188, and solenoids 215a and 215b are part of solenoid valves which control hydraulic cylinder 215. Also, solenoids 201a and 202a, 377a and 430a are coupled to three-way valves which control cylinders 201 and 202, 377 and 430, respectively.

The microswitches 104 and 105, 135 and 140, which are responsive to the passage of the cross strands are shown in this figure with a microswitch 525 which is responsive to the position of the clamp, a switch 530 which is responsive to the moving table, and switches 540 and 550 which are responsive to the position of the top blade.

The microswitch 525 is positioned as shown in FIGS. 3 and 4, to detect the clamping of the mesh on lower cutting blade 211 and the microswitch 530 is shown in FIG. 4 and is actuated by a flange 531 coupled to the table 55. The microswitches 540 and 550 are shown positioned in FIG. 3 on the frame 80 to detect the upward and downward extreme positions of the upper blade 210.

The operation of the cutting and stacking machine and associated control system is as follows. Assuming that a length of wire mesh equal in length to ten cross strands is desired, the rotary switch 500 is therefore placed in the number 10 position which corresponds to a length of wire equal to ten cross strands. The wire mesh is then permitted to be fed into cutter portion 40 by the driving mechanism 24 from reel 19. Upon passage of the first cross strand, normally open microswitch 104 will close, thereby causing current to flow through normally closed contacts 1 through 4 of relay $RL_1$ which in turn passes a current through stepper coil 503. This moves a stepping switch contact 505 to the one position. As the next cross strand of wire passes under wheel 94, the stepping coil is again actuated and moves stepping switch contact 50 to the second position. Simultaneously with the counting of the cross strands, the normally closed switches 135 and 140 are opened by the passage of the cross strands of wire under the sensing wheels 120 and 121. If the passage of a cross strand opens one of the switches, such as switch 135 before the switch 140, solenoid 48a of a four-way valve will be de-energized before solenoid 48b of the same valve. The de-energization of solenoid 48a and will cause cylinder 48 to pivotally move carriage 43 on base 41 toward the right and in a direction to compensate for the misalignment of the cross strand with respect to the wheel 121 and, more importantly with respect to the cutter blades 200 and 211. When the same cross strand passes under wheel 121 to de-energize solenoid 48b, the carriage will be prevented from continuing to pivot and the correction is completed. It is to be understood that the switches 135 and 140 could be operated as normally opened switches if the sensing and correcting system were constructed such that the energization of the solenoids would provide for correction of misalignment of the wire.

The counting of the cross strands continues in the same manner until the counting of the tenth cross strand by wheel 94, whereupon switch 104 is caused to close, thereby stepping contact 505 to position ten. The movement of contact 505 makes or closes the circuit between rotary switch 500 and stepping switch 502, thereby energizing relay coils 2 through 10 or relay $RL_2$. This closes normally open contacts 9 through 11 and 6 and 7 of relay $RL_2$.

The closing of contacts 9 through 11 applies power to the left side of switch 105 and also energizes coils 2 through 10 of relay $RL_7$, thereby closing contacts 1 through 3. This passes a current through stop solenoids 185a, 186a, 187a and 188a coupled to three-way valves which control stop cylinders 185 through 188.

The passing of current through the stop solenoids causes the stops to move downward in a direction to make contact with the cross strands of the wire mesh. From the front view of a stop shown in FIG. 8, it will be noted that the stops are pivoted in a manner such that if they come down directly on a vertical cross strand rather than on a horizontal cross strand, they will be deflected to one side or the other. Further, from FIG. 9 it will be observed that the stops, although pivotable to avoid vertical cross strands, are mounted such that they are unyieldable when in contact with a horizontal cross strand.

During the counting of the cross strands, the sled 360 of the stacker has received the wire mesh. The sled hooks 380 and 381, cooperating with sled hooker member 396, ride over the first cross strand, thereby grabbing onto the wire mesh. The wire mesh is prevented from moving in the sled by backup plate 413. As the counting mechanism continues to count, sled 360 begins to slide toward the left, as more clearly shown in FIG. 1, on its guide-roller arrangement.

When the topmost portion of the tenth cross strand passes under wheel 94 such that normally open switch 105 is closed, power is applied across coils 2–10 of relay $RL_5$, thereby closing relay contacts 1–3, 6, 7 and 9–11. The closing of normally open contacts 9–11 applies current to solenoids 201a and 202a, thereby controlling three-way valves which actuate cylinders 201 and 202. This causes clamp 200 to move down toward the wire and hold it firmly in place against the bottom blade 211.

Clamp 200, upon clamping the wire, closes normally open switch 525 mounted on frame 80. Closure of switch 525 applies power across relay coils 2–10 of $RL_4$ to close normally open contacts 9–11 and 1–3 of $RL_4$. Closing of contacts 9–11 applies power to solenoid 64a of a three-way valve which actuates cylinder 64. The actuation of cylinder 64 moves the table in the direction of flow of the wire over the table. Simultaneously, solenoid 430a of a three-way valve actuates cylinder 430 to close wire clamp plunger 431 on guide wire 340 of the stacker or palettizer, thereby preventing the sled from continuing to slide toward the left of FIG. 1. Thus sled 360, stacker 300 and cutting table 55 begins to move in unison toward the left side of FIG. 1. Due to pivoted member 335 being coupled to sled 360 by the clamping of wire 340, the sled moves at a velocity greater than that of the table to effectively withdraw the wire mesh and still be in position to receive the next piece of wire. The closing of contacts 6 and 7 of $RL_5$ also energizes solenoid 215a coupled to a hydraulic valve means which actuates cylinder 215 to bring the blade down upon the wire, also closure of contacts 6 and 7 opens normally closed contacts 1 through 4 of relay $RL_6$ by energizing coils 2 through 10 of $RL_6$. This removes power from the left side of switch 540, shown in FIG. 3. Switch 540 is a normally closed switch which is held in an open condition when the upper blade 210 is raised.

The closing of switch 525 also energizes coils 2 through 10 of relay $RL_3$, thereby closing contacts 1–3, 9–11 and opening contacts 5 and 6. Closing of contacts 1–3 of relay $RL_3$ applies a current to reset coil 504 of stepping switch 502 which, in turn, de-energizes relay $RL_2$. This removes the power from the switch 105.

After the upper blade 210 severs the wire mesh 20, the normally closed switch 550 is opened by the blade. The opening of switch 550 opens relay $RL_5$, de-energizing solenoid 215a and de-energizing relay $RL_6$. The de-energization of relay $RL_6$ permits normally closed contacts 1 through 4 of relay $RL_6$ to close, which permits solenoid 215b to be energized. Solenoid 215b then applies hydraulic fluid to cylinder 215 in such a manner as to return the blade to the raised position. The opening of switch 550 also opens normally closed contacts 1 through 4 of relay $RL_8$ which de-energizes stop solenoids 185a, 186a, 187a and 188a, to raise stops 185 through 188. When the blade has been completely raised, switch 540 is opened and solenoid 215b is de-energized. During movement of the blade the table has been moving toward the left side of the paper. At the time the table reaches the extent of its run on the carriage, flange 64 actuates the switch 530 which is a switch having one normally closed contact and one normally open contact. Actuation of switch 530 opens relay $RL_4$ to de-energize solenoid 64a, causing the table to return to the right side of the carriage. Further, solenoid 430a is de-energized which releases wire clamp 430. Also, the closing of normally open switch 530 energizes solenoid 377a of a three-way valve controlling cylinder 377 to release the wire mesh on pile 361.

As the table begins to return to the right of FIG. 1, switch 530 is opened, thereby de-energizing solenoid 377a. Further, as the table and stacker move toward the right side of FIG. 1, sled 360 with the aid of gravity and its downward-sloped guide-roller arrangement, returns to its far right position to receive the next piece of wire mesh passing through the cutter. The table 55 is permitted to move back and forth an the preferred embodiment at substantially the same tangential speed that the wire is fed from the reel although it should be understood that the speed may be varied by controlling the pneumatic valves coupled to cylinder 64 depending on the cutting portion of the cycle. In the preferred embodiment, the table moves only approximately eighteen inches during the entire cutting and stacking operation, although depending on the size of the material to be cut, this may be varied. This completes the general description of the operation of the machine tool of this invention.

Figure 17:
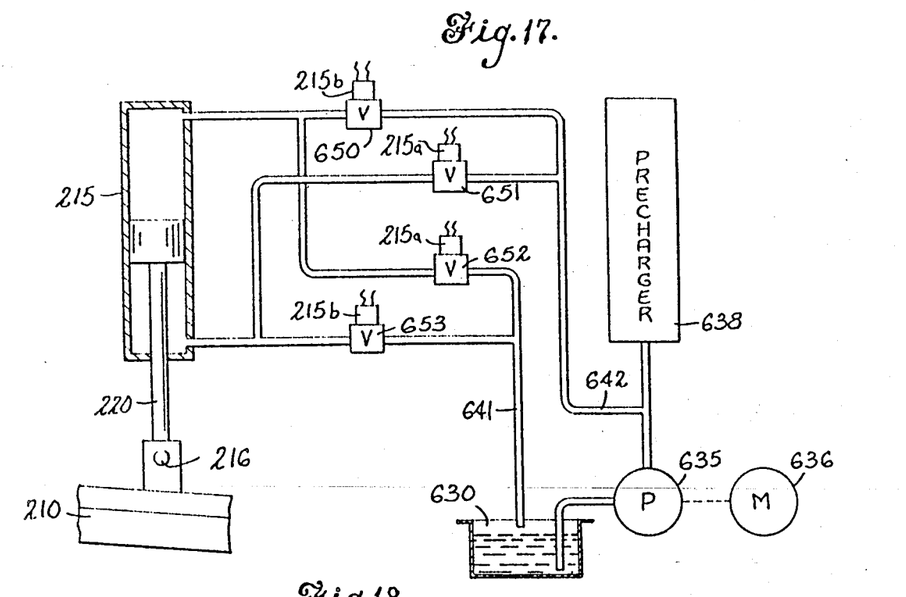
FIG. 17 is a diagrammatic representation of a hydraulic system suitable for use in the machine according to this invention.

In FIG. 17 there is disclosed a suitable hydraulic system for moving the blade 210 in a direction to sever the wire mesh and for moving the blade in an upward direction after the severing operation. Shown in the figure is the blade 210 coupled to the hydraulic cylinder 215 by way of a ram 220 and a pin coupling means 216. In order to provide hydraulic fluid to the cylinder, a conventional reservoir 630 having hydraulic fluid therein and coupled to a pump 635 and a motor 636 arrangement is provided. Also coupled to the pump outlet tube is a hydraulic fluid precharger 638. The pump and precharger are coupled to a cylinder inlet tube 642 and a reservoir 630 is connected to a cylinder outlet tube 641. To direct hydraulic fluid into the cylinder 215 in a manner adapted to raise and lower blade 210, four hydraulic solenoid valves, 650 through 653 are provided. Valves 650 and 653 respond to solenoid 215b whose input lines are shown extending from these solenoid valves, and valves 651 and 652 are responsive to solenoid 215a. Valves 650 through 653 are open when their respective solenoids are de-energized and closed when their respective solenoids are energized. Therefore, to move the blade downward to sever the wire mesh, solenoid 215a is energized as described with the description of FIG. 15 to close valves 651 and 652, and solenoid 215b is de-energized thereby opening valves 650 and 653. To return the blade 210 to the raised position, solenoid 215a is de-energized, opening valves 651 and 652 and solenoid 215b is energized closing valves 650 and 653. It should be understood that other suitable arrangements of the valves and/or pneumatic system could be utilized to effect the timed movement of the blade in accordance with the teachings of this invention.

Figure 18:
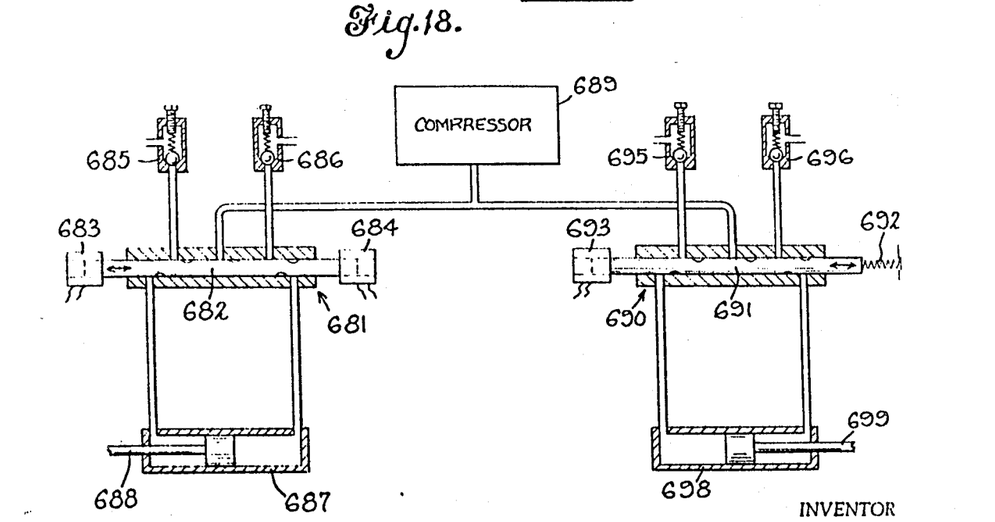
FIG. 18 is a diagrammatic representation of a pneumatic value system suitable for use in the machine according to this invention.

Referring now to FIG. 18, there is shown in the left side of the figure a four-way pneumatic valve system and in the right side of the figure a three-way pneumatic valve system. The four-way valve system is suitable for driving the cylinder 48 to pivotally move carriage 43 in a direction to compensate for wire misalignment. The three-way valve system is suitable for actuating the table cylinder 64, the step cylinders 185 and 186, the clamp cylinders 201 and 202 and the stacker cylinders 377 and 430.

The four-way valve system comprises a valve 681 having a spool 682 with a plurality of cylindrical openings therein for guiding the passage of air between various inlet and outlet tubes. Mounted on valve 681 are two solenoids for magnetically controlling the position of the spool 682. Also coupled to valve 681 are spring-loaded speed valves 685 and 686 and pneumatic cylinder 687. The valve operates in response to energization of the solenoids. For example, if solenoid 683 were energized and solenoid 684 were de-energized, the spool 682 would move toward the left, thus permitting air to exit through one of the speed valves and thereby controlling the rate of movement of rod 688. When solenoids 683 and 684 are simultaneously energized, the piston rod will remain in a stationary position. Compressed air is provided to the cylinder 687 by a compressor 689.

The three-way valve system comprises a valve 690 with a spool 691 which is connected by a spring 692 to the interior of the valve. Coupled to the opposite end of the valve 690 is a solenoid 693 magnetically controlling the magnetic field responsive spool 691. Connected to valve 690 are speed valves 695 and 696 and a cylinder 698 having a piston rod 699. By energizing the solenoid the spool is moved to permit air to flow to thereby move the rod 699 toward the right of the figure. When the solenoid is de-energized, air is permitted to flow into the valve to move the rod in the opposite direction. The spring-loaded speed valves control the rate at which air is permitted to exit from the valve. Compressed air is also provided to valve 698 by compressor 689. The valves mentioned above may be purchased from the Versa Company of Ridgefield, New Jersey and the cylinders may be purchased from the Hennells Company of Belleville, Michigan. It is to be understood that hydraulic valve systems may be substituted for the pneumatic system, or vice versa, without departing from the spirit and scope of this invention.

If it were desirable to determine the length of material to be cut from paper, foil, steel strip, sheet, or the like, in place of cross-stranded wire mesh disclosed in the preferred embodiment, the revolutions of the counting wheel 94 could be determined to provide an indication of the length of material passing under the wheel. This could be accomplished by providing the counting wheel with a protrusion which would actuate a switch after each revolution. Further, optical measuring systems, photoelectric systems, or other suitable measuring devices may be utilized. Additionally, sensing means such as a photocell arrangement could be utilized in place of the preferred feeler wheels 120 and 121 to provide a means for moving the carriage to correct for misalignment of the material with respect to the cutter blades.

It will thus be seen that the objects set forth above, among those made apparent from the preceding description, are efficiently attained and, since certain changes may be made in carrying out the above method and in the construction set forth without departing from the scope of the invention, it is intended that all matter contained in the foregoing description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Apparatus for cutting pieces of cross-stranded wire mesh material from a length of said material, comprising a table over which said material is fed, means for cutting said material mounted on said table, means supported by said table for holding said material on said table, means for moving said table in the same direction that the material is fed over said table, means for permitting said cutting means to substantially cut said material when said table is moving, said wheel means for counting said cross strands, the position of said wheel means on said cross strands of said material initiating the clamping of said material on said table.

2. Apparatus comprising a base, a carriage mounted for pivotal movement on said base, a table mounted on said carriage over which material is fed, a cutter carried by said table, means for determining the alignment of said material on said table, and means for pivoting one end of said carriage to correct for misalignment of said material on said table with respect to said cutter.

3. Apparatus for cutting predetermined lengths of cross-stranded wire mesh from a roll of said wire mesh material, comprising a table over which said wire mesh material is fed, means for sensing the number of cross strands of said mesh material, means for cutting said material supported by said table, and means for moving said table in the same direction that the wire mesh material is being fed over the table.

4. Apparatus according to claim 3, including stop means for engaging said cross strands prior to actuating said means for cutting said material to align said material with respect to said means for cutting.

5. In combination, means for feeding cross-stranded wire mesh material, a cutting apparatus for receiving said cross-stranded wire mesh material, said cutting apparatus comprising a table over which said material is fed, means for counting the cross strands of said material to determine the amount of material to be cut, means for cutting said material supported by said table, means for moving said table in the same direction that the material is being fed over the table, means for only permitting any substantial cutting of said material by said cutting means to take place while said table is moving, and stacking means for latching a cross stand of said material while said material is being counted and cut and for releasing said material after said material has been cut by said cutting means.

6. Apparatus for cutting pieces of material from a length of said material fed to said apparatus, comprising a base, a carriage pivotally mounted on said base, a table over which said material is fed, said table being slidably mounted on said carriage and movable in a direction parallel to the direction of flow of said wire mesh over said table, and a cutter supported by said table.

7. Apparatus according to claim 6, including means for moving said table with respect to said carriage in the same direction that the material is being fed over said table.

8. Apparatus according to claim 7, including means for actuating the cutter to sever said material during the time the table is moving in the same direction as the material is being fed to the table.

9. Apparatus for cutting pieces of cross-stranded wire mesh material from a length of said material fed to said apparatus, comprising a base, carriage pivotally mounted on said base, a table over which said material is fed, said table being slidably mounted on said carriage and movable in a direction parallel to the direction of flow of said material over said table, a cutter mounted on said table, stop means supported by said table, and means for actuating said stop means to cause said stop means to engage the cross strands of said wire mesh, thereby pivoting said carriage and said table to align said wire mesh with respect to said cutter.

10. Apparatus according to claim 9, including means for moving said table in the same direction as the material is fed over the table prior to cutting said material.

11. Apparatus according to claim 10, including means for moving the cutter to cut the material after the table begins to move.

12. Apparatus for continuously cutting predetermined lengths of cross-stranded wire mesh material from a strip of said material, comprising a base, a carriage pivotally mounted on said base, a table over which said material is fed slidably supported by said carriage, material length determining means supported by said table, material cutting means supported by said table, means for moving said table on said carriage in the same direction as the flow of said material over said table, clamping means supported by said table for clamping said material on said table, means for substantially simultaneously actuating said clamping means and said means for moving the table after the length of material is determined, and means for moving said cutting means to sever said material after said clamping and table-moving means have been actuated.

13. Apparatus in accordance with claim 12, including stop means supported by said table for engaging a cross strand of the wire mesh material to pivotally move said carriage to align said table-supported cutter with respect to said material, said stop means actuated after the length of the material is determined but before the actuation of the clamping means and the means for moving the table.

14. Apparatus in accordance with claim 13, including driving roll means for continuosly feeding the material over said table, at least some of said roll means having protrusions to engage said wire material to push said material toward said table.

15. Apparatus for continuously cutting predetermined lengths of cross-stranded wire mesh material from a strip of said material, comprising a table over which the material is fed, cutting means supported by said table, material length determining means positioned on said table, clamping means supported by said table for clamping said material on said table, means for moving said table in the same direction as the flow of said material over said table, means for actuating said clamping means and said means for moving said table after the length of material is determined, stop means supported by said table for engaging a cross strand of the material to align said cutting means with respect to the material, said stop means being actuated after the length of material is determined but before movement of said clamping means and said table.

16. Apparatus in accordance with claim 15, including means for moving said cutter to sever the wire material after said clamping means and said table have been actuated.

17. Apparatus for continuously cutting predetermined lengths of cross-stranded wire mesh material from a strip of said material, comprising a table over which the material is fed, cutting means supported by said table, material length determining means positioned on said table, clamping means supported by said table for clamping said material on said table, means for moving said table in the same direction as the flow of material over said table, means for actuating said clamping means and said means for moving said table after the length of material is determined, a base, a carriage for slidably supporting said table pivoted to said base, stop means for engaging a cross strand of the material to pivotally move said carriage and align said table and said cutting means with respect to the material, said stop means being actuated after the length of material is determined but before movement of said clamping means and said table.

References Cited by the Examiner

UNITED STATES PATENTS

| | | | |
|---|---|---|---|
| 1,439,963 | 12/1922 | Kamper | 83—319 X |
| 1,583,188 | 5/1926 | Schumacher | 83—318 |
| 1,859,319 | 5/1932 | Sussman | 83—318 X |
| 2,287,833 | 6/1942 | Ridgway | 83—294 X |
| 2,612,912 | 10/1952 | Brekle | 83—319 X |
| 2,707,816 | 5/1955 | Henderson | 83—319 X |
| 2,827,809 | 3/1958 | Beam | 226—19 X |
| 2,859,813 | 11/1958 | Klotz | 83—74 |
| 3,040,609 | 6/1962 | Bowman | 83—294 X |
| 3,095,131 | 6/1963 | Robertson et al. | 226—19 X |
| 3,081,657 | 3/1963 | Harris | 83—319 X |
| 3,107,589 | 10/1963 | Goettsch et al. | 83—74 X |
| 3,164,048 | 1/1965 | Wray et al. | 83—310 X |
| 3,174,373 | 3/1965 | Gensman | 83—319 X |

FOREIGN PATENTS

| | | |
|---|---|---|
| 292,796 | 6/1916 | Germany. |
| 955,552 | 4/1964 | Great Britain. |

WILLIAM W. DYER, JR., *Primary Examiner.*

ANDREW R. JUHASZ, *Examiner.*

JAMES M. MEISTER, *Assistant Examiner.*